Patented Dec. 23, 1952

2,623,078

UNITED STATES PATENT OFFICE 2,623,078

PREPARATION OF HYDROGENATION CATALYSTS BY REDUCTION

Thomas Bewley, Epsom, and Peter L. Bramwyche, London, England, assignors to The Distillers Company Limited, Edinburgh, Scotland, a British company No Drawing. Application August 8, 1950, Serial No. 178,360. In Great Britain August 19, 1949

15 Claims. (Cl. 260—690)

The present invention relates to the preparation of active hydrogenation catalyst by the reduction of kieselguhr-supported copper or nickel compounds suspended in a fluid medium.

It has been found that, if a liquid or semi-liquid organic polysiloxane is present during the reduction of the supported metal compound, the production of an active hydrogenation catalyst is greatly facilitated. The invention comprises the novel processes and steps of processes, specific embodiments of which are described hereinafter by way of example and in accordance with which I now prefer to practise the invention.

The present invention comprises a process for the preparation of active hydrogenation catalysts which comprises reduction to the active condition by the treatment with hydrogen of a kieselguhr-supported copper or nickel compound which is reducible to the metal, suspended in a liquid medium comprising an organic polysiloxane. This reduction may be effected as a preliminary step before the material to be hydrogenated is added to the catalyst, or the latter may be present from the commencement, the effective hydrogenation naturally not taking place before substantial reduction of the catalyst has been effected. The copper and nickel compounds which may be used are suitably those compounds such as oxide, hydroxide or carbonate, which are susceptible to reduction by hydrogen to the active state.

The organic polysiloxane employed is preferably polydimethyl siloxane; also it is to be noted that other organic polysiloxanes are also suitable. The liquid medium which is used may consist of a substantially liquid organic polysiloxane or, alternatively, it may consist of an organic polysiloxane, whether liquid or not, in solution in an organic solvent. Suitable organic solvents include alcohols such as 2-ethylhexanol and 2-methyl-2:4-pentane diol, and others such as 2:2-dibutoxydiethyl ether.

The following examples, in which the parts referred to are by weight, illustrate the process of the present invention and show, at the same time, some applications of the catalysts produced.

EXAMPLE 1

30 parts of a basic copper carbonate-kieselguhr catalyst (prepared by precipitating from a copper salt solution in the presence of kieselguhr by means of potassium carbonate solution, washing until neutral and drying at 60° C.) were dispersed in a medium consisting of 250 parts of 2-ethyl hexanol and 10 parts of liquid polydimethyl-siloxane and heated to 145° C. Hydrogen was passed through the stirred suspension for 6 hours during which time the temperature was raised slowly to 165° C., the loss of the 2-ethyl hexanol being avoided by means of a reflux condenser. Four 100 part batches of alphamethylstyrene in isopropyl benzene (50:50 mixture) were then hydrogenated at 160° C., using this catalyst suspension, without appreciable loss of catalytic activity, the average time required for complete reduction per batch being 2–3 hours. The hydrogenation products were distilled from the reaction medium in each case through a short fractionating column and the alphamethylstyrene content of the products was less than 0.5%.

Precisely similar results were obtained in two subsequent catalyst preparations using only 5 parts and 2.5 parts respectively of the polydimethylsiloxane in the 260 parts of medium, the temperature employed for the reduction in the latter case being 160 to 170° C., all the other conditions being the same. Attempts to hydrogenate alphamethylstyrene in this way with catalysts prepared in the absence of the polysiloxane were unsuccessful.

EXAMPLE 2

A mixture of 150 parts of 2,2'-dibutoxydiethyl ether, 5 parts of polydimethylsiloxane grease and 30 parts of the basic copper carbonate-kieselguhr catalyst described in Example 1 was treated with hydrogen at 150° C. for 13 hours. The resulting catalyst suspension was very active for the hydrogenation of alphamethylstyrene at 150° C.

EXAMPLE 3

60 parts of the basic copper carbonate-kieselguhr catalyst described in Example 1 were dispersed in 500 parts of polydimethylsiloxane fluid and the catalyst was reduced with hydrogen for 2 hours at 150° C. followed by 2 hours at 175° C. when hydrogen absorption was complete. 400 parts of nitrobenzene were added to the catalyst suspension during 9 hours at a temperature of 240 to 250° C., the hydrogen feed being approximately 3 parts per hour. The percentage conversion to aniline was 97.4.

EXAMPLE 4

616 parts of nickel nitrate crystals were dissolved in 1,000 parts of water, and 125 parts of kieselguhr were stirred in. Aqueous potassium carbonate was then added to the well-stirred mixture until the product was alkaline to phenolphthalein and the precipitate-kieselguhr mixture was filtered off and washed until neutral to phenolphthalein, giving 302 parts of catalyst after drying at 100° C. 30 parts of this catalyst were then dispersed in 250 parts of polydimethylsiloxane fluid, heated to 200° C. and treated with hydrogen until absorption was complete, taking 6 hours. Nitrobenzene was then fed into the suspension at 200 to 220° C. during 14 hours with somewhat more than the theoretical amount of hydrogen, the total feed being 600 parts of nitrobenzene. The conversion to aniline was 66.5%.

For the purposes of comparison, attempts were made to reduce the above-described nickel-kieselguhr catalyst to the active state dispersed in corresponding amounts of aniline, liquid polymeric alphamethylstyrene and nitrobenzene at 170 to 210° C. These attempts proved unsuccessful, and the catalyst, after treating with hydrogen as described above, would not promote the hydrogenation of nitrobenzene or alphamethylstyrene at 200 to 220° C.

The process of the foregoing examples can be carried out using copper or nickel compounds such as the oxides or hydroxides thereof, reducible by hydrogen to the active state.

The hydrogenation catalysts prepared in accordance with the present invention catalyse the hydrogenation of unsaturated and reducible compounds such as acrolein, crotonaldehyde, propionaldehyde, alkoxyaldehydes, unsaturated hydrocarbons and the like.

For comparative purposes the following experiments were carried out.

Experiment 1

A copper oxide-kieselguhr catalyst was prepared by the precipitation from a hot solution of copper sulphate in the presence of kieselguhr by means of sodium hydroxide. This catalyst, after drying at 60° C. was suspended in 2-methyl-2:4-pentane diol and reduced by treatment with hydrogen for 12 hours at a temperature of between 160° to 170° C. The catalyst obtained exhibited such a powerful dehydrogenation activity that the 2-methyl-2:4-pentane diol was rapidly split to acetone.

Experiment 2

A copper oxide kieselguhr catalyst prepared as described in Experiment 1 was suspended in 2:2-dibutoxydiethyl ether and reduced by treatment with hydrogen at 170° C. The catalyst obtained was khaki-coloured and proved inactive for the hydrogenation of di-acetone alcohol at 75° C. under 300 lbs./sq. in. pressure.

Experiment 3

A copper oxide kieselguhr catalyst prepared as described in Experiment 1 was suspended in dibutyl phthalate and reduced by treatment with hydrogen at 160–170° C. for 12 hours. When the catalyst obtained was used for the hydrogenation of di-acetone alcohol, no hydrogen absorption was observed and the di-acetone alcohol was quantitatively split to acetone.

Experiment 4

A copper oxide kieselguhr catalyst prepared as described in Experiment 1 was suspended in dibutylphthalate and reduced by treatment with hydrogen at 160–170° C. for 12 hours. A mixture of crotonaldehyde and hydrogen were passed into this catalyst suspension at 170° C. and it was found that the catalyst remained active for only about 12 hours.

These comparative experiments detailed above show clearly the advantages attendant upon the process of the present invention and the necessity of effecting reduction of kieselguhr-supported copper or nickel compounds in the presence of an organic polysiloxane if an active hydrogenation catalyst is to be obtained.

We claim:

1. A process which comprises passing hydrogen into a liquid suspension comprising a polysiloxane, kieselguhr carrier and a metallic compound selected from the group consisting of copper and nickel compounds and reducing said compounds to form a catalyst containing the metal.

2. A process in accordance with claim 1 in which the metallic catalyst is formed in the presence of a reducible organic substance and using said hydrogen both to reduce said metal compound and said organic substance.

3. A process in accordance with claim 1 in which a liquid reducible organic substance is hydrogenated in the presence of the suspension in which said catalyst is formed.

4. A process as claimed in claim 1, wherein the metal compound is an oxide.

5. A process as claimed in claim 1, wherein the metal compound is a hydroxide.

6. A process as claimed in claim 1, wherein the metal compound is a carbonate.

7. A process as claimed in claim 1, wherein the organic polysiloxane is a polydimethylsiloxane.

8. A process for the preparation of active hydrogenation catalysts which comprises reducing a material consisting of a metal compound selected from the group consisting of copper and nickel compounds disposed on a kieselguhr support, which is suspended in a liquid medium consisting of an organic solvent and an organic polysiloxane, to form a catalyst containing the corresponding metal.

9. A process as claimed in claim 6, wherein the organic polysiloxane is a polydimethylsiloxane.

10. A process as claimed in claim 6, wherein the organic solvent is 2-ethyl hexanol.

11. A process as claimed in claim 6, wherein the organic solvent is 2:2-dibutoxydiethyl ether.

12. A process for the hydrogenation of reducible organic compounds which comprises treating said compound with hydrogen in the presence of a catalyst prepared by the hydrogenation of a material consisting of a metal compound selected from the group consisting of copper and nickel compounds disposed on a kieselguhr support, which is suspended in a liquid medium comprising an organic polysiloxane, to form a catalyst containing the corresponding metal.

13. A hydrogenation catalyst comprising a metal selected from the group consisting of copper and nickel and kieselguhr as a carrier therefor, said metal and kieselguhr being suspended in a liquid medium containing polysiloxane.

14. A hydrogenation catalyst in accordance with claim 13 in which the polysiloxane is a polydimethylsiloxane.

15. A hydrogenation catalyst in accordance with claim 13 in which the polysiloxane is dissolved in an organic solvent therefor.

THOMAS BEWLEY.
PETER L. BRAMWYCHE.

REFERENCES CITED

The following references are of record in the file of this patent:

UNITED STATES PATENTS

| Number | Name | Date |
|---|---|---|
| 2,067,368 | Williams et al. | Jan. 12, 1937 |
| 2,320,063 | Borkowski | May 25, 1943 |